(12) United States Patent
Townsend et al.

(10) Patent No.: US 6,279,954 B1
(45) Date of Patent: Aug. 28, 2001

(54) RESTRAINT BELT PRESENTER HAVING OFFSET ROTARY ACTION

(75) Inventors: John A. Townsend; Mohamed E. M. El-Sayed, both of Bloomfield Hills; Arthur L. Guertin, Rockwood; Paul J. Delorean, Bloomfield Hills; John E. Campbell, Hazel Park; Michael P. Kaczmar, Royal Oak, all of MI (US)

(73) Assignee: Joalto Design, Inc., Southfield, MI (US)

( * ) Notice: Subject to any disclaimer, the term of this patent is extended or adjusted under 35 U.S.C. 154(b) by 0 days.

(21) Appl. No.: 09/362,271

(22) Filed: Jul. 28, 1999

(51) Int. Cl.[7] .................................................. B60R 22/03
(52) U.S. Cl. ...................... 280/801.1; 280/804; 280/808; 297/473; 297/481
(58) Field of Search ................................ 280/801.1, 804, 280/808; 297/468, 473, 477, 481, 483

(56) References Cited

U.S. PATENT DOCUMENTS

| | | | |
|---|---|---|---|
| 3,630,543 | * 12/1971 | Cripps et al. | 297/481 |
| 4,291,898 | * 9/1981 | Finn et al. | 280/804 |
| 4,363,501 | * 12/1982 | Takada | 280/804 |
| 4,531,762 | 7/1985 | Sasaki et al. | |
| 4,589,680 | * 5/1986 | Gurtler et al. | 280/804 |
| 4,783,098 | * 11/1988 | Yokouchi | 297/481 |
| 5,022,677 | * 6/1991 | Barbiero | 297/473 |
| 5,505,491 | 4/1996 | Townsend | 280/801.1 |
| 5,538,283 | 7/1996 | Townsend | 286/801.1 |
| 5,924,772 | * 7/1999 | Pleyer et al. | 297/473 |
| 6,193,275 | * 2/2001 | Knox | 280/808 |

FOREIGN PATENT DOCUMENTS

| | | |
|---|---|---|
| 3537089 A1 | 4/1987 | (DE) . |
| 2171892 | 9/1986 | (GB) . |
| 2235361A | 3/1991 | (GB) . |
| 2235362 | 3/1991 | (GB) . |

OTHER PUBLICATIONS

International Search Report for Application No. PCT/US00/20443 dated Nov. 27,2000.
English Abstract of DE 3537089 from Derwent.

* cited by examiner

Primary Examiner—J. J. Swann
Assistant Examiner—Christopher Bottorff
(74) Attorney, Agent, or Firm—Rader, Fishman & Grauer PLLC

(57) ABSTRACT

A restraint belt presenter assembly includes a restraint belt engaging member that is selectively driven by a track drive mechanism to catch and pull a restraint belt from its unused position to a presentation position for grasping by a vehicle occupant. The restraint belt engaging member includes a housing having an L-shaped slot that receives a finger assembly wherein the finger assembly has a rotary offset with locking movement for maintaining the finger assembly in an actuating position.

13 Claims, 4 Drawing Sheets

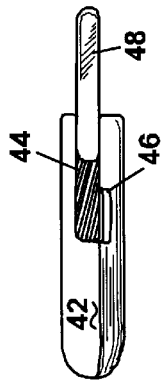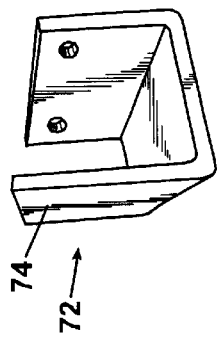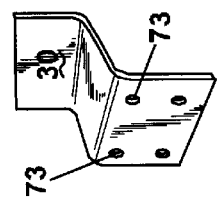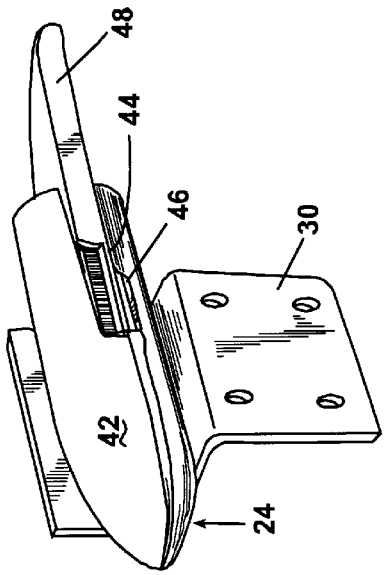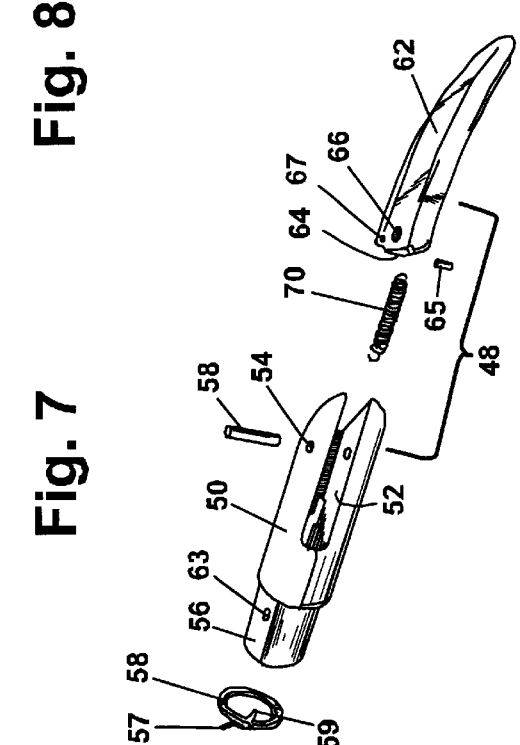

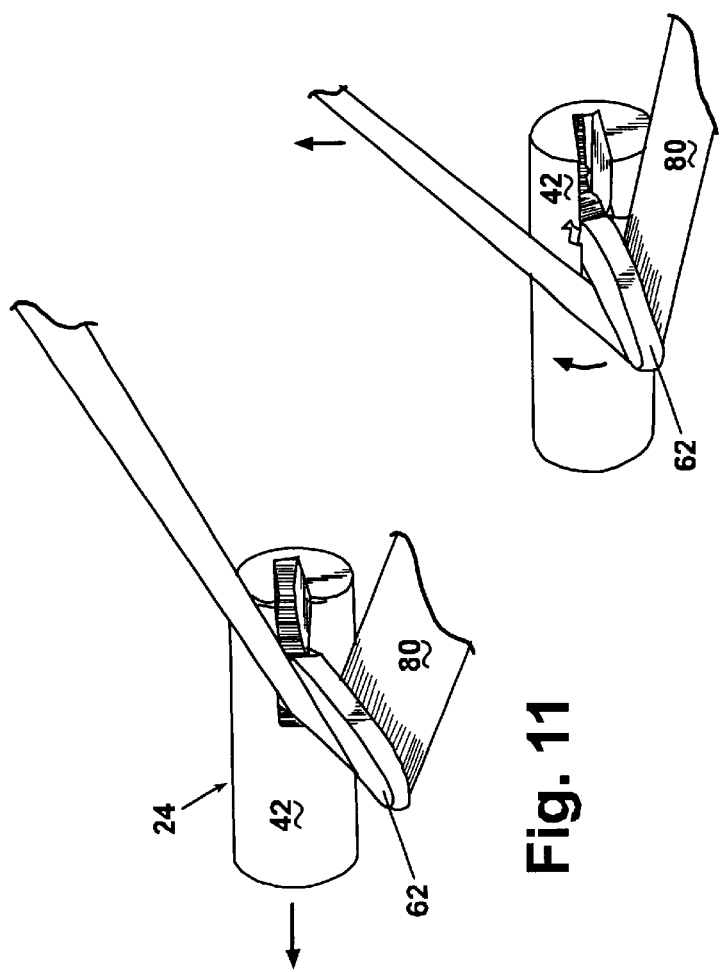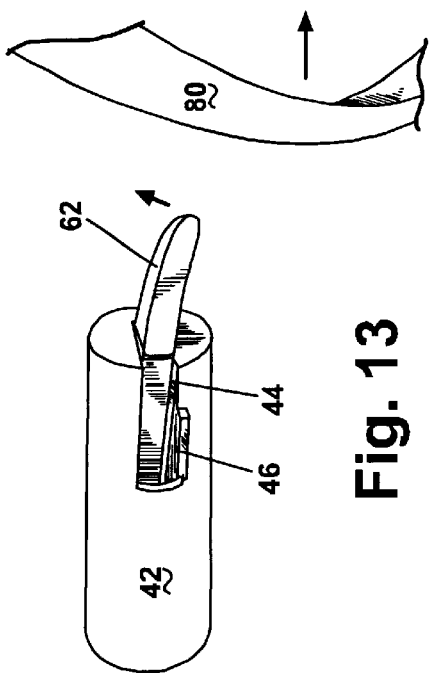

RESTRAINT BELT PRESENTER HAVING OFFSET ROTARY ACTION

FIELD OF THE INVENTION

The present invention relates to a restraint belt presenter for vehicles, and more particularly to a presenter system that presents the restraint belt to a vehicle occupant.

BACKGROUND OF THE INVENTION

The use of restraint belts in vehicles is known for providing vehicle occupants with protection in the event of a collision or accident. Conventional restraint belts include a combination of a lap belt portion and shoulder belt portion formed from a continuous belt. In such an arrangement, one end of the belt is anchored to a structural floor member of the vehicle behind a seat on its outboard side. The other end is secured to a retracting mechanism mounted on or in the 'B' pillar rearward from the vehicle door, the outboard edge of the ceiling or floor, or in the seat back. A buckle for engaging with a receptacle positioned adjacent to the inboard side of the vehicle seat, is slidably attached to the belt. When not in use, the retracting mechanism biases the belt and buckle toward the outboard side of the vehicle.

To secure a restraint belt, the vehicle occupant typically must first twist around the seat and reach across their body to try and grab the buckle that is located above and behind the seat. Next, the occupant must draw the buckle and belt across his body such that the shoulder belt portion extends from the retracting mechanism diagonally across the occupant's chest while the lap belt portion is directed across the occupant's lap. Finally, the occupant must releasably secure the buckle to the receptacle. Such prior art restraint systems are undesirable. It is awkward for an occupant to twist around and grab a buckle. Thus, statistics have shown that people will often forget or forego using such prior art restraint systems.

To overcome the problems associated with conventional restraints systems, another type of restraint system known as a "passive" restraint system has been developed. One such passive restraint system uses separate lap and shoulder belts. The lap belt is of a conventional design wherein a retracting mechanism is positioned adjacent to the seat on its outboard side. The shoulder belt has one end attached to the inside of the upper rear corner of the vehicle door. The other end is engaged with a separate retracting mechanism adjacent to the inboard side of the seat. When the vehicle door is opened, the belt extends from the inboard side of the seat away from the seat to the outer corner of the vehicle door, so as to enable the vehicle occupant to enter the vehicle between the shoulder belt and the seat. Once the door is pulled shut, the inboard end of the shoulder belt retracts, thereby securing the shoulder belt around the vehicle occupant. The lap belt is then separately secured across the occupant's lap. While restraint systems of this type reduce the problems associated with the awkward manual fastening of the restraint belt, the positioning of shoulder belt reduces the available room in which the vehicle occupant may enter and exit the vehicle, thus hindering entry and exit of the vehicle.

To provide more room to enter and exit the vehicle, another known type of passive restraint system has the outboard end of the shoulder belt attached to a movable shuttle riding in a track along the upper periphery of the door opening. When the door is opened, the shuttle automatically moves the outboard end of the shoulder belt forward along the track. More room is provided for the occupant to enter and exit the vehicle without becoming inadvertently entangled in the shoulder belt. The lap belt still must be separately and manually fastened across the occupant's lap in the conventional manner.

To simplify restraint systems, another known type of restraint system includes a pivotable armrest positioned on the outboard side of a vehicle seat that has a combination shoulder and lap restraint belt secured in a detent mechanism at the lower forward inboard end of the armrest when the armrest. An end of the lap belt is anchored to the floor of the vehicle while an end of the shoulder belt is retractably attached to a belt reel and tensioner. When the armrest is in a lowered position, the detent serves to position the belt buckle in plain view and adjacent the vehicle occupant to permit easier grasping of the belt buckle for fastening. A guide incorporated with the armrest further assures the proper positioning of the buckle. When the belt is unbuckled and the armrest raised, the buckle is automatically returned to the detent by belt reel and tensioner to maintain the proper positioning of the buckle for the next use. However, the addition of the guide and the detent to the armrest still provide additional manufacturing steps, thereby increasing costs.

Therefore, there exists a need for a restraint presentation system that insures reliable capturing and positioning of the belt for repeated use.

SUMMARY OF THE INVENTION

The present invention is directed to a restraint belt presenter assembly for bringing a restraint belt forward comprising a housing having a slot with a recessed portion and a finger assembly movably received in the housing for movement relative to the slot. A biasing member is located in the housing for rotationally biasing the finger assembly toward an actuated position in the recessed portion of the slot. In addition, a track drive mechanism is connected to the housing for selectively driving the housing from an initial position to a final position.

The finger assembly further includes a shaft that is connected to a finger, preferably by a pivoting connection. Moreover, the shaft has a slot for receiving a portion of the finger and a bushing is optionally mounted on the shaft for reducing friction between the shaft and the housing. The drive mechanism includes a carriage moved along a track by a belt driven by a motor. Also, a projecting feature is provided along the return path of the presenter assembly for engaging the finger assembly and assisting in moving the finger assembly to the actuated position in a resetting or cocking motion.

Accordingly, the restraint belt presenter assembly of the present invention provides a reliable, efficient device for capturing a restraint belt, moving the belt to a presentation position, allowing a user to easily grasp the belt and remove it from the presenter, and returning the presenter to a starting position to once again be ready to capture the restraint belt during the next restraint belt presentation cycle.

The smooth offset rotary movement of the finger assembly provides a positive mechanical connection for the finger while engaging and moving the belt. In addition, the finger assembly retracts to a streamlined unactuated position to minimize the possibility of the finger interfering with surrounding structure such as the vehicle seat, while the presenter assembly is traveling back to its starting position.

BRIEF DESCRIPTION OF THE DRAWINGS

The features and inventive aspects of the present invention will become more apparent upon reading the following detailed description, claims, and drawings, of which the following is a brief description:

FIG. 3 is a perspective view of a restraint belt engaging member.

FIG. 4 is an exploded perspective view of a restraint belt engaging member according to the present invention.

FIG. 5 is a top view of a restraint belt engaging member.

FIG. 6 is a side view of the restraint belt engaging member.

FIG. 7 is a perspective view of a bracket.

FIG. 8 is a perspective view of a projecting feature.

FIGS. 11–13 illustrate a restraint belt engaging member at various positions during a restraint belt presenting process.

DETAILED DESCRIPTION OF PREFERRED EMBODIMENTS

Figures 1, 2:
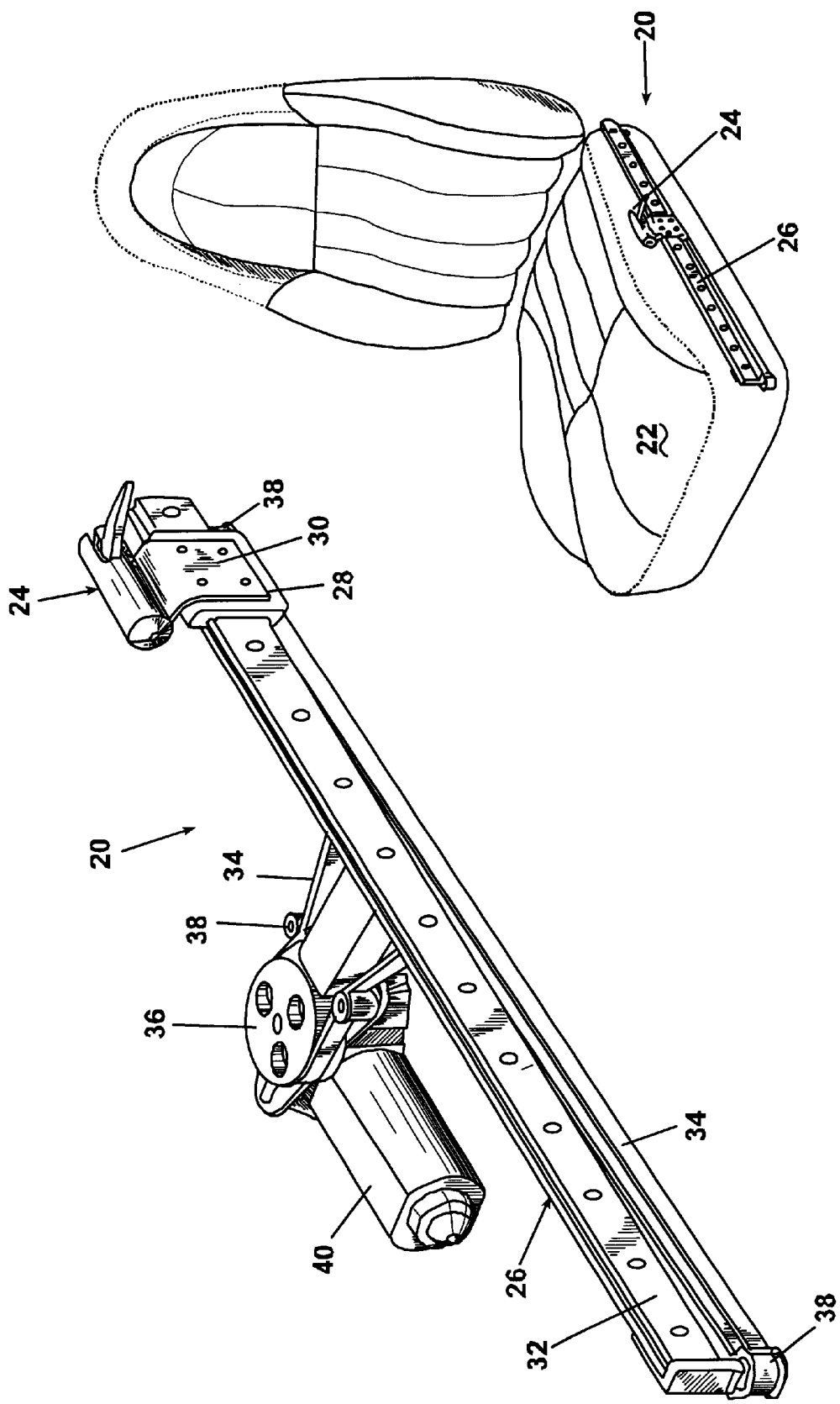
FIG. 1 is a perspective view of a restraint belt presenter attached to a vehicle seat.
FIG. 2 is a perspective view of a restraint belt presenter assembly according to the present invention.

FIG. 1 shows a restraint belt presenter assembly 20 mounted on a vehicle seat 22 according to the present invention. Restraint belt presenter assembly 20 includes a restraint belt engaging member 24 that is movably mounted to a track drive mechanism 26 for selectively moving the restraint belt engaging member 24 through the restraint belt presentation cycle from a starting position to a presentation position and back to the starting position.

FIG. 2 shows the restraint belt presenter assembly 20 including restraint belt engaging member 24 being mounted to a carriage 28 by mounting bracket 30. Track drive mechanism 26 includes a generally elongated track 32 for receiving and guiding carriage 28. Carriage 28 is connected to a drive belt 34 which is driven by a tooth drive gear pulley 36 and engages a series of idler pulleys 38 located adjacent drive pulley 36 and at the ends of track 32. Drive pulley 36 is connected to a motor 40 for powering drive pulley 36.

FIG. 3 shows a perspective view of the restraint belt engaging member 24 mounted to mounting bracket 30. Restraint belt engaging member 24 includes a housing 42 having an L-shaped slot 44 with a recessed portion 46. Housing 42 is preferably a generally hollow cylinder for receiving a finger assembly 48. Finger assembly 48 is illustrated in FIG. 3 in a fully retracted position.

FIG. 4 shows restraint belt engaging member 24 in an exploded perspective view including housing 42 for receiving finger assembly 48 which includes a shaft 50 having a longitudinally extending slot 52 with an aperture 54 formed generally perpendicular to slot 52. Shaft 50 is preferably generally cylindrical in shape and includes a reduced diameter section 56 for mounting to a torsion spring 58. Respective ends 59 of torsion spring 58 are inserted into corresponding apertures 61, 63 provided in housing 42 and shaft 50, respectively. In addition, an optional but preferable bushing 60 is also mounted on shaft 50 to reduce friction between shaft 50 and housing 42. Next, a finger 62 is designed to be inserted into slot 52 of shaft 50 such that one end 64 of finger 62 having an aperture 66 is aligned with shaft aperture 54 and a pin 58 pivotally connects finger 62 to shaft 50. An extension spring 70 is further provided for biasing finger 62 relative to shaft 50 toward a retracted, unactuated position as shown in FIGS. 3, 5 and 6. Extension spring 70 has its respective ends anchored on shaft 50 and finger 62 using, for example a pin 65 located in a slot 67. Further, a switch 71 cooperates with restraint belt engaging member 24 and a control unit (not shown) to control movement of restraint belt engaging member 24.

FIG. 7 shows mounting bracket 30 having a generally Z-shaped profile and further including a least one aperture 73 for connecting bracket 30 to carriage 28.

Figure 9:
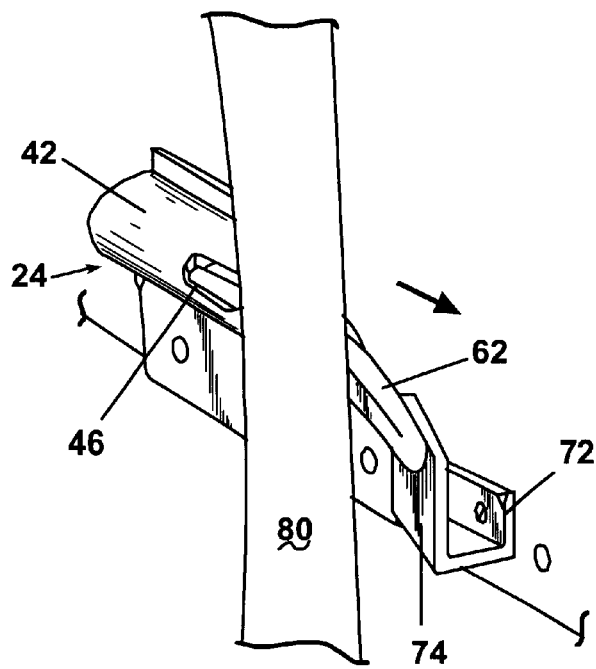
FIG. 9 shows the restraint belt engaging member being reset to an actuating position.
Figure 10:
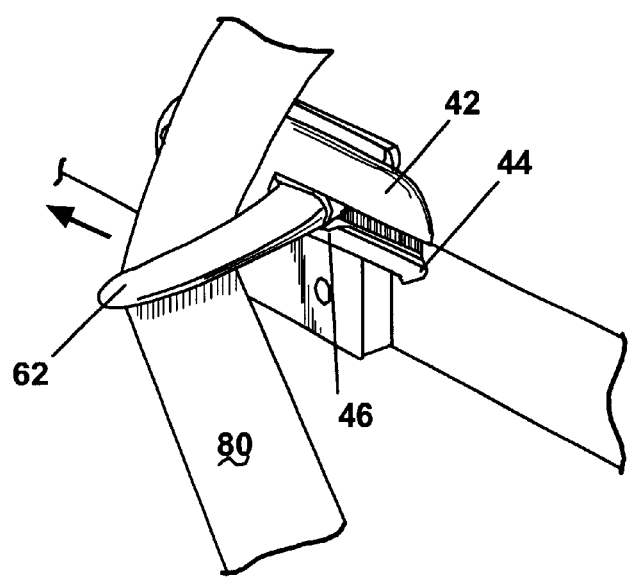
FIG. 10 illustrates the restraint belt engaging member carrying a restraint belt forward.

FIG. 8 shows a projecting feature 72 that includes a ramp surface 74 for engaging finger 62 as restraint belt engaging member 24 returns to the starting position. Ramp surface 74 engages finger 62 and helps reposition finger 62 to an actuated position generally perpendicular to housing 42 as illustrated in FIGS. 9 and 10. Although projecting feature 72 is illustrated as a generally U-shaped bracket, it is envisioned to use any suitable shape that accomplishes re-setting of finger 62.

FIG. 9 shows a partial view of a restraint belt engaging member 24 traveling rearwardly toward its starting position as indicated by the arrow. Finger 62 engages ramp surface 74 of projecting feature 72 such that finger 62 is moved from a retracted, unactuated position, generally coaxial with housing 42, to an actuated position located in recessed portion 46 of L-shaped slot 44 and generally perpendicular to housing 42. Torsion spring 58 rotates shaft 50 and finger 62 into recessed portion 46 once finger 62 pivots to a position above the recessed portion 46.

A restraint belt 80 is shown is FIGS. 9 and 10 and projecting feature 72 is positioned along the return travel path such that finger 62 is able to travel rearwardly without contacting or interfering with restraint belt 80. However, once finger 62 is in an actuated position as illustrated in FIG. 10, finger 62 is designed to catch and engage restraint belt 80 for traveling forward toward a restraint belt presenting position.

FIGS. 11–13 illustrate various stages of a restraint belt presenting cycle. In FIG. 11, restraint belt engaging member 24 is traveling forward with finger 62 in an actuated position carrying restraint belt 80. Finger 62 is biased to rotate into recessed portion 46 of L-shaped slot 44 by torsion spring 58.

FIG. 12 shows restraint belt 80 being pulled upwardly and laterally inwardly by a vehicle occupant who is strapping the restraint belt across her body. As illustrated by the arrows, restraint belt 80 pulls finger 62 upwardly and counteracts the biasing force of torsion spring 58 thereby raising finger 62 out of recessed portion 46. Simultaneously, finger 62 is biased rearwardly by extension spring 60 which pivots finger 62 to its retracted unactuating position illustrated in FIG. 13. Thus, when finger assembly 48 is moved to an actuated position, it undergoes an offset rotary locking type of motion wherein finger 62 pivots along a longitudinal slot 44 and then is rotated with shaft 50 downwardly relative to housing 42 such that finger 62 is stationed within recessed portion 46.

The restraint belt presenter of the present invention can be fabricated using any suitable materials, including but not limited to, steel, aluminum, and plastic.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A restraint belt presenter assembly for bringing a restraint belt forward comprising:
    a housing having a slot with a recessed portion;
    a finger assembly movably received in said housing for movement relative to said slot;
    a biasing member located in said housing for rotationally biasing said finger assembly toward an actuated position in said recessed portion of said slot; and
    a track drive mechanism mounted to a side surface of a vehicle seat, said track drive mechanism including an elongated track member and a selectively movable belt member;
    wherein said housing is slidably mounted on said track member and said belt member is operatively connected to said housing to selectively drive said housing from an initial position to a final position.

2. The restraint belt presenter assembly of claim 1, wherein said finger assembly further includes a shaft having a slot that receives an end of a finger.

3. The restraint belt presenter assembly of claim 2, wherein said finger is pivotally connected in said slot of said shaft.

4. The restraint belt presenter assembly of claim 2, further including a bushing mounted on said shaft for reducing friction between said shaft and said housing.

5. The restraint belt presenter assembly of claim 1, wherein said drive mechanism further includes a carriage slidably mounted to said track by said belt member, wherein said belt member is driven by a motor, said housing being fixedly mounted on said carriage.

6. The restraint belt presenter assembly of claim 5, further including a mounting bracket having a first portion connected to said carriage and a second portion for supporting said housing.

7. The restraint belt presenter assembly of claim 1, further including a projecting feature mounted adjacent to said vehicle seat for engaging said finger assembly and assisting in moving said finger assembly to the actuated position.

8. A restraint belt presenter assembly for bringing a restraint belt forward comprising:
    a housing having a generally longitudinal slot with a recessed portion;
    a shaft having a reduced diameter section movably received in said slot within said housing for rotational movement relative to said slot;
    a finger pivotally connected to said shaft for pivoting movement along said longitudinal slot;
    a biasing member located in said housing for rotationally biasing said shaft toward an actuated position;
    a spring member connected to said finger and said shaft for biasing said finger toward an actuated position; wherein said finger is positioned in said recessed portion of said slot; and
    a track drive mechanism mounted to a side surface of a vehicle seat, said track drive mechanism including an elongated track member, a selectively movable belt member and a motor for driving said belt member;
    wherein said housing is slidably mounted on said track member and said belt member is operatively connected to said housing to selectively drive said housing from an initial position to a final position.

9. The restraint belt presenter assembly of claim 8, further including a projecting feature mounted adjacent said vehicle seat and opposite said track member for engaging said finger and assisting in moving said finger to the actuated position.

10. The restraint belt presenter assembly of claim 8, wherein said track drive mechanism further includes a carriage slidably mounted to said track by said belt member, wherein said belt member is driven by a motor, said housing being fixedly mounted on said carriage.

11. The restraint belt presenter assembly of claim 10, further including a mounting bracket having a first portion fixedly connected to said carriage and a second portion for supporting said housing.

12. The restraint belt presenter assembly of claim 8, wherein said biasing member is a torsion spring and said torsion spring is mounted on said reduced diameter section of said shaft.

13. The restraint belt presenter assembly of claim 12, further including a bushing member mounted on said shaft to reduce friction between said shaft and said housing.

* * * * *